United States Patent
Chung et al.

(10) Patent No.: US 7,958,383 B2
(45) Date of Patent: Jun. 7, 2011

(54) COMPUTER SYSTEM WITH ADJUSTABLE DATA TRANSMISSION RATE

(75) Inventors: Chien-Ping Chung, Taipei (TW); Cheng-Wei Huang, Taipei (TW); Chi Chang, Taipei (TW)

(73) Assignee: Via Technologies, Inc., Taipei (TW)

( * ) Notice: Subject to any disclaimer, the term of this patent is extended or adjusted under 35 U.S.C. 154(b) by 524 days.

(21) Appl. No.: 12/191,411

(22) Filed: Aug. 14, 2008

(65) Prior Publication Data

US 2009/0049327 A1    Feb. 19, 2009

(30) Foreign Application Priority Data

Aug. 15, 2007 (TW) .............................. 96130189 A

(51) Int. Cl.
*G06F 1/04* (2006.01)
*G06F 5/06* (2006.01)
*G06F 1/00* (2006.01)
(52) U.S. Cl. ..................... 713/600; 713/501; 713/502
(58) Field of Classification Search .................. 713/300, 713/310, 320, 324, 500–502, 600, 601; 710/60, 710/105, 106; 709/233
See application file for complete search history.

(56) References Cited

U.S. PATENT DOCUMENTS

| | | | | |
|---|---|---|---|---|
| 5,983,355 A * | 11/1999 | Kenny et al. | .................. | 713/322 |
| 6,047,038 A * | 4/2000 | Broadhurst et al. | ............ | 377/16 |
| 6,112,309 A * | 8/2000 | Inoue et al. | .................... | 713/501 |
| 6,134,667 A * | 10/2000 | Suzuki et al. | ................. | 713/300 |
| 6,317,841 B1 * | 11/2001 | Nagae et al. | ................... | 713/322 |
| 6,321,341 B1 * | 11/2001 | Kamijo et al. | ................. | 713/340 |
| 6,470,289 B1 * | 10/2002 | Peters et al. | .................. | 702/132 |
| 7,146,510 B1 * | 12/2006 | Helms et al. | .................. | 713/300 |
| 2003/0120960 A1 * | 6/2003 | Cooper | ......................... | 713/320 |
| 2006/0053310 A1 * | 3/2006 | Su et al. | ........................ | 713/300 |
| 2008/0263254 A1 * | 10/2008 | Su et al. | ........................ | 710/310 |

OTHER PUBLICATIONS

Brunner, Rich. "TSC and Power Management Events on AMD Processors". GNT. Online 2-Nov. 2005. Retrieved from Internet Mar. 16, 2011. <http://us.generation-nt.com/answer/tsc-power-management-events-amd-processors-help-180269181.html>.*

"Mobile Intel Pentium 4 Processor-M". Specification Update. Document No. 250721-037. Intel Corporation. Dec. 2006. pp. 1-43.*

* cited by examiner

*Primary Examiner* — Thomas J Cleary

(74) *Attorney, Agent, or Firm* — Kirton & McConkie; Evan R. Witt

(57) ABSTRACT

A computer system has an adjustable data transmission rate between a CPU and a core logic chip thereof. In the computer system, the CPU has a power state adjustable in response to a power management control signal issued by the core logic chip. For adjusting data transmission rate between the CPU and the core logic chip, a change of an asserted time of the power management control signal from a first time period to a second time period is first determined to obtain an index value. The data transmission rate is increased or decreased according to the index value.

20 Claims, 7 Drawing Sheets

COMPUTER SYSTEM WITH ADJUSTABLE DATA TRANSMISSION RATE

FIELD OF THE INVENTION

The present invention relates to a computer system with an adjustable transmission rate and also relates to a method and a device for adjusting data transmission rate.

BACKGROUND OF THE INVENTION

A personal computer has had more and more applications since its functions are improved day by day. No matter for a desktop computer, laptop computer, media center or any further developed computer with a more compact size or more complicated function, nowadays, power consumption is always an issue that the designer should pay attention to.

Conventionally, an Advanced Power Management (APM) specification plays a key role for power management designs. The power managements based on the APM specification are typically performed at a BIOS firmware level, and thus have limitations when applied in modern computer systems. Nowadays, the most popular power management in the art is based on an Advanced Configuration and Power Interface (ACPI) specification, which is performed by way of an operating system of a computer system. According to the ACPI specification, the power management of a computer is implemented with a plurality of power states, for example, including a performance state, a processor state and a sleep state. Generally, in the processor state, the ACPI specification defines the state of a central processing unit as one of the following: C0 (normal operational state), C1 (suspension state), C2 (stop clock state) and C3 (sleeping state). The operating system in the computer system has the CPU selectively enter one of the four states according to the utilization rate of the CPU. In other words, the higher power-saving level the CPU enters, the lower the power voltage is supplied to the CPU so as to reduce power consumption of the computer system to a greater level.

Please refer to FIG. 1A, which schematically illustrating power management means of a conventional computer system. The computer system 1 includes a CPU 10 and a chipset 11 consisting of a north bridge chip 111 and a south bridge chip 112. The CPU 10 communicates with the north bridge chip 111 via a Front Side Bus (FSB) 100. Once the computer system 1 is to enter the processor state, an operating system executed in the computer system (not shown) determines which of the above-mentioned states C0, C1, C2 and C3 should be entered according to the operational condition of the computer system. If the CPU 10 is to enter the C2 or C3 state, the south bridge chip 112 issues a stop clock signal STPCLK (STPCLK#) and a sleep signal SLP (SLP#) to the CPU 10 to lower the data processing rate as well as supplied voltage in order to save power. Furthermore, depending on different power-saving states, the way the south bridge chip 112 asserts the stop clock signal STPCLK and the sleep signal SLP to the CPU 10 may change, as illustrated in FIG. 1B and FIG. 1C. For example, when the state the CPU 10 to enter is the C3 state, i.e. the sleeping state, it means that the CPU 10 should stop all work. Therefore, both the stop clock signal STPCLK and the sleep signal SLP issued by the south bridge chip 112 should be asserted, i.e. switched to at an effective level such as a low voltage level 1121 (FIG. 1C), to assure of the C3 state of the CPU 10. In another example that the CPU 10 is to enter the C2 state which is less power-saving compared to the C3 state, it means that the CPU does not stop working but preserves some power for readily restoring operation. Accordingly, the stop clock signal STPCLK issued by the south bridge chip should be kept asserted while the sleep signal SLP should be de-asserted, i.e. switched to an ineffective level such as a high voltage level (FIG. 1B), in order to be flexible for restoration of power.

As described above, the operating system is used to detect the working condition of the computer system and determine the power-saving state of the CPU according to the ACPI specification. However, other hardware devices cannot timely respond to the update of the state of the CPU. For example, the data transmission rate of a Front Side Bus cannot be adjusted according to the current state of the CPU. Therefore, there is a need to further improve the power management of the computer system.

SUMMARY OF THE INVENTION

Therefore, an object of the present invention is to make improvement in the power management architecture by adjusting a data transmission rate of a Front Side Bus dynamically.

The present invention provides a method for adjusting a data transmission rate between a CPU and a core logic chip of a computer system in response to a power management control signal. The method includes: determining a change of an asserted time of the power management control signal from a first time period to a second time period to obtain an index value; and adjusting the data transmission rate between the CPU and the core logic chip according to the index value.

The present invention also provides a device for adjusting a data transmission rate between a CPU and a core logic chip of a computer system in response to a power management control signal. The device includes: a signal-detecting unit for determining a change of an asserted time of the power management control signal from a first time period to a second time period to obtain an index value; and a frequency-adjusting unit in communication with the signal-detecting unit for adjusting the data transmission rate between the CPU and the core logic chip according to the index value.

The present invention further provides a computer system having an adjustable data transmission rate between a CPU and a core logic chip thereof. The computer system includes: the CPU having a power adjustable state in response to a power management control signal; and the core logic chip in communication with the CPU via a Front Side Bus, which includes: a signal-detecting unit for determining a change of an asserted time of the power management control signal from a first time period to a second time period to obtain an index value; and a frequency-adjusting unit in communication with the signal-detecting unit for adjusting the data transmission rate of the Front Side Bus between the CPU and the core logic chip according to the index value.

BRIEF DESCRIPTION OF THE DRAWINGS

The above contents of the present invention will become more readily apparent to those ordinarily skilled in the art after reviewing the following detailed description and accompanying drawings, in which.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 1A:
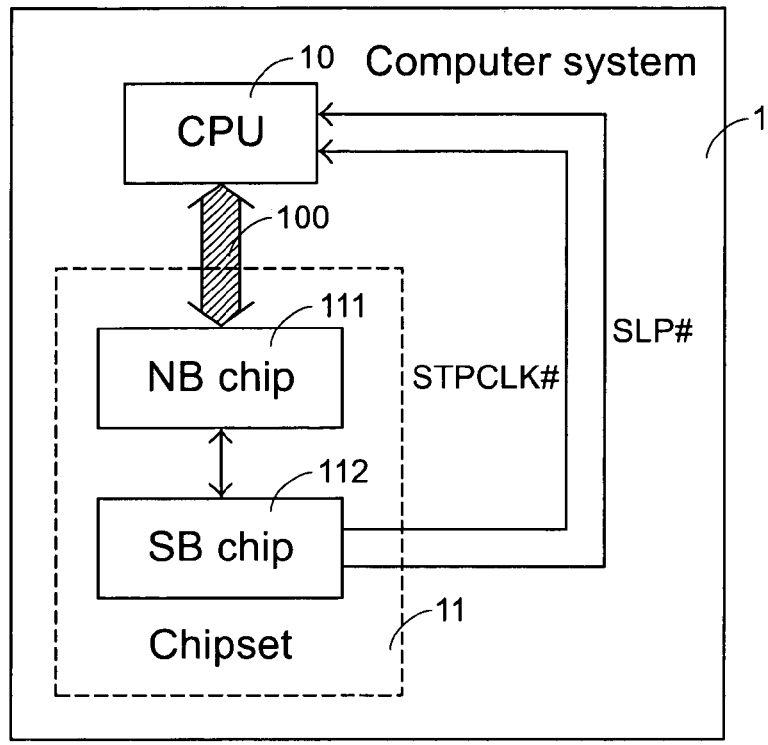
FIG. 1A is a functional block diagram schematically illustrating a conventional power-saving architecture of a computer system.
Figure 1B:
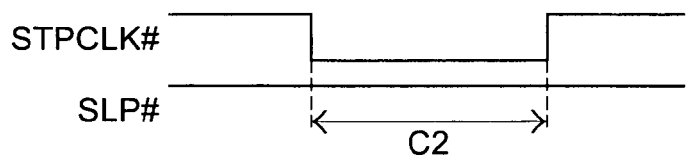
FIG. 1B is a waveform diagram schematically exemplifying a C2 power-saving state according to ACPI specification.
Figure 1C:
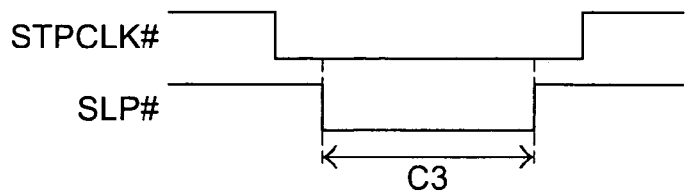
FIG. 1C is a waveform diagram schematically exemplifying a C3 power-saving state according to ACPI specification.
Figure 2A:
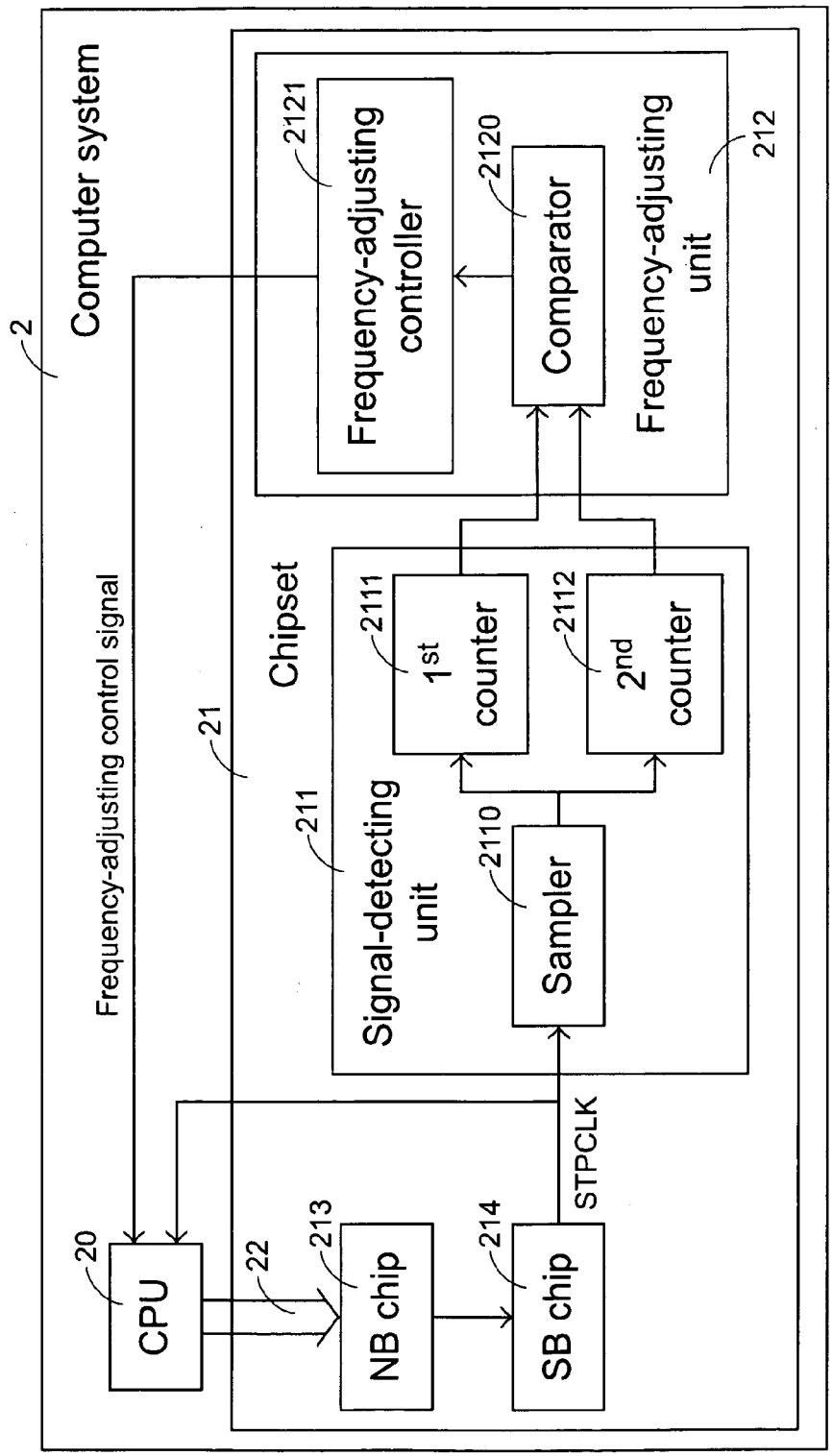
FIG. 2A is a functional block diagram schematically illustrating a power-saving architecture of a computer system according to a first embodiment of the present invention.

Please refer to FIG. 2A, which illustrates the adjustment of a data transmission rate according to an embodiment of the present invention applicable to a processor state of a computer system 2, e.g. the CPU-adjustable state C0 (normal operational state), C1 (suspension state), C2 (stop clock state) or C3 (sleeping state), to improve the performance of a CPU 20 of the computer system 2. In the computer system 2, a core logic chip 21 is in communication with the CPU 20 via a Front Side Bus 22, and controls a data transmission rate between the CPU 20 and the core logic chip 21 by issuing a power management control signal. The core logic chip 21 includes a north bridge chip 213 and a south bridge chip 214. The power management control signal is issued by the south bridge chip 214. In the embodiment, the core logic chip 21 further includes a signal-detecting unit 211 and a frequency-adjusting unit 212. The signal-detecting unit 211 detects the variations of the waveform of the power management control signal within a first time period and within a second time period, respectively, and obtains an index value according to the variations. The first time period may be a previous period; the second time period may be a current period. The frequency-adjusting unit 212 coupled to the signal-detecting unit 211 then adjusts the data transmission rate between the CPU 20 and the core logic chip 21, i.e. the data transmission rate of the Front Side Bus 22, according to the index value. The signal-detecting unit 211 includes a sampler 2110, a first counter 2111 and a second counter 2112. The frequency-adjusting unit 212 includes a comparator 2120 and a frequency-adjusting controller 2121.

When it is necessary for the CPU to enter an adjustable state, e.g. C2 or C3 state, the power management control signal issued by the south bridge chip 214 is a stop clock signal STPCLK. The stop clock signal STPCLK is asserted (asserted means, e.g. set as a low voltage level; while in another embodiment of the present invention, STPCLK could also be asserted as a high voltage level) in a stop-clock asserting state and is de-asserted (de-asserted means, e.g. set as a high voltage level; while in another embodiment of the present invention, STPCLK could also be de-asserted as a low voltage level) in a stop-clock de-asserting state. The sampler 2110 coupled to the south bridge chip 214 then samples the stop clock signal STPCLK at specified time points within the first time period and the second time period, respectively. For example, the first time period and the second time period are both set to be 1 second, and every two adjacent sampling time points have an interval of 10 ms. Afterwards, the first counter 2111 and the second counter 2112 coupled to the sampler 2110 count the sampled times of an effective level, e.g. a low level, of the stop clock signal STPCLK within the first time period and the second time period, respectively, so as to generate a first counting value and a second counting value. The first and second counting values respectively indicate the total asserted time of the stop clock signal STPCLK within the first and second time periods. For example, if STPCLK is asserted as a low voltage level, count the sampled times of the effective level means to count the occurrences of low voltage levels. The comparator 2120 coupled to the first counter 2111 and the second counter 2112 compares the first counting value and the second counting value so as to generate the index value indicating the change from the first counting value to the second counting value. If the index value is greater than a threshold, the frequency-adjusting controller 2121 issues a frequency-adjusting control signal to the CPU 20 to slow down the data transmission between the CPU 20 and the core logic chip 21. On the contrary, if the index value is less than a threshold, the frequency-adjusting controller 2121 issues a frequency-adjusting control signal to the CPU 20 to speed up the data transmission between the CPU 20 and the core logic chip 21.

When the data transmission between the CPU 20 and the core logic chip 21 needs to be changed, the Phase Lock Loop (PLL) of CPU needs to be reset, which means CPU clock should be stopped for a while. Thus, it is to be noted that the CPU first enters C3 state (sleeping state) while the data transmission rate is changed in response to the index value, and then is awaken to work after the adjustment of data transmission rate has been completed. The above-described method for adjusting the data transmission rate is summarized in the flowchart of FIG. 2B.

Figure 2B:
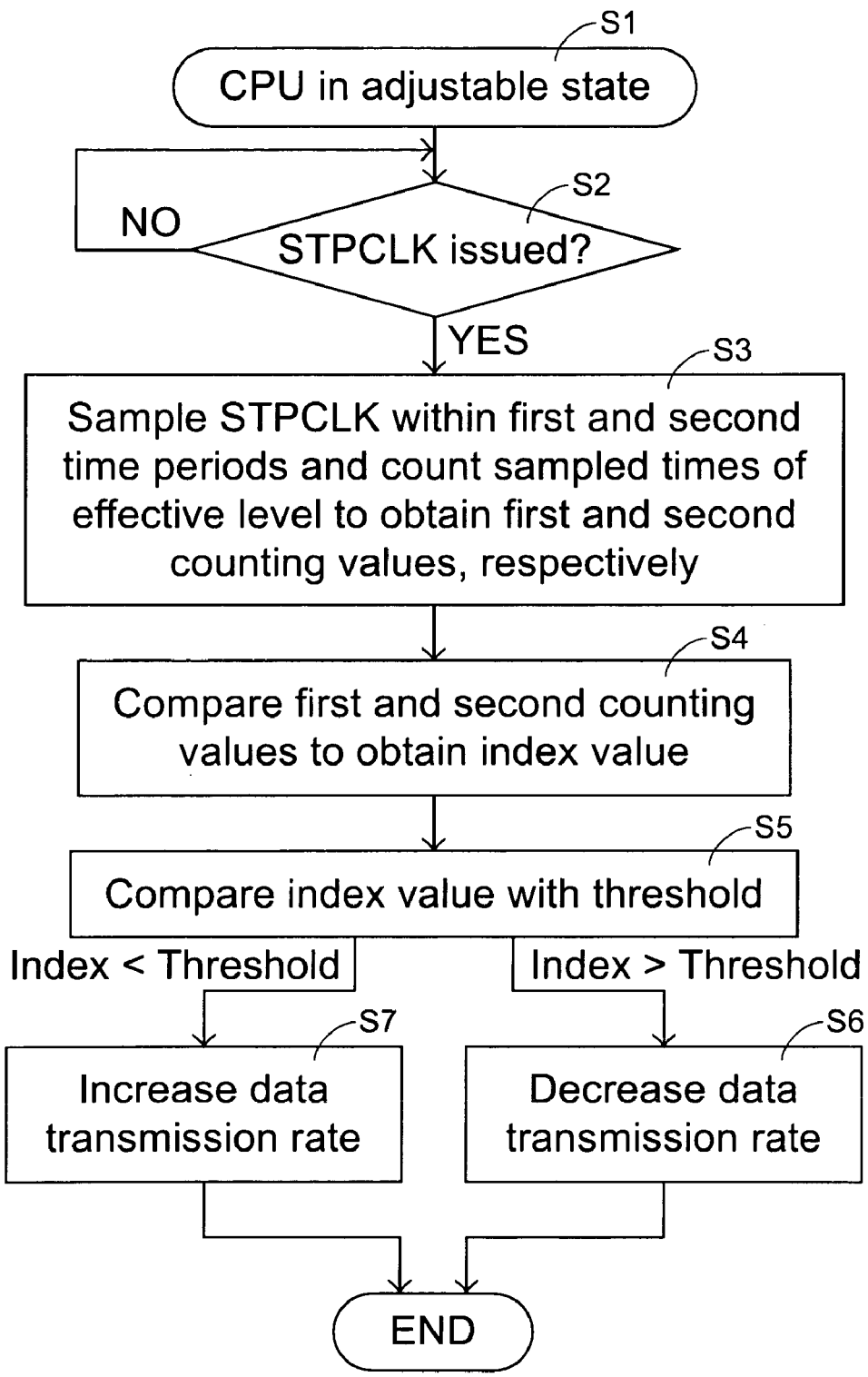
FIG. 2B is a flowchart summarizing a method for adjusting a data transmission rate applicable to the architecture of FIG. 2A.

Please refer to FIG. 2B, FIG. 2B is a flowchart summarizing a method for adjusting a data transmission rate applicable to the architecture of FIG. 2A. The method begins at Step S1, CPU enters an adjustable state (Step S1); then determine whether the stop clock signal STPCLK is issued (Step S2); if STPCLK is issued, sample the stop clock signal STPCLK within first and second time periods, and count the sampled times of an effective level of STPCLK to obtain first and second counting values, respectively (Step S3); then compare first and second counting values to obtain an index value indicating the change from the first counting value to the second counting value (Step S4); then compare the index value with a threshold (Step S5); if the index value is greater than the threshold, then decrease the data transmission rate (Step S6); if the index value is less than the threshold, then increase the data transmission rate (Step S7).

In this embodiment, in addition to adaptively determine a proper power-saving state as defined in the ACPI specification according to the utilization rate of the CPU, the hardware of the core logic chip is modified to be able to detect the variations of the power management control signal, and adjusts the data transmission rate between the CPU and the core logic chip according to the detected result. In addition to monitoring the utilization rate of CPU by software, the new hardware architecture of the core logic chip of the invention greatly improves the performance of the computer system. As a result, the computer system becomes more power-efficient.

Figure 3:
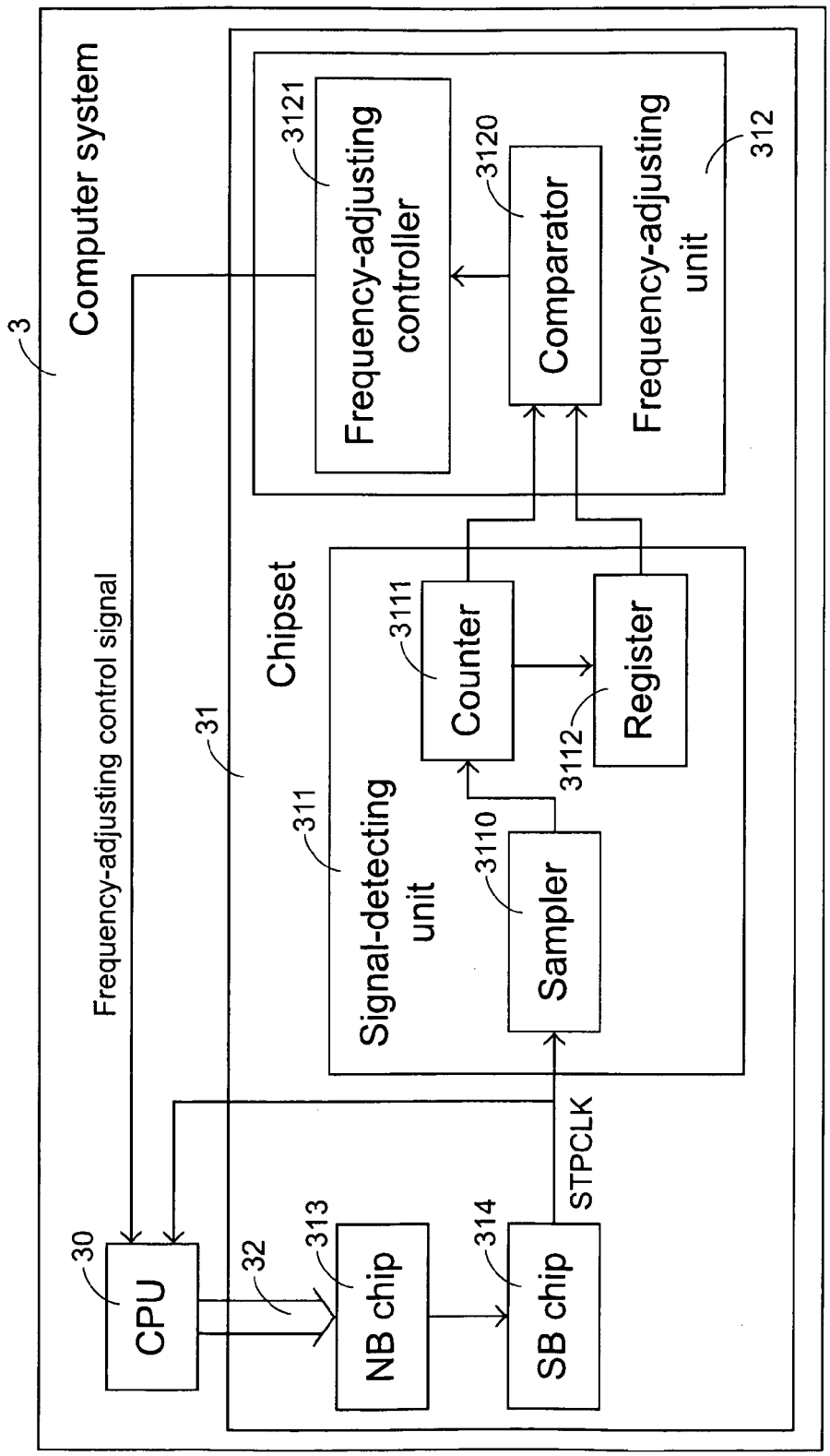
FIG. 3 is a functional block diagram schematically illustrating a power-saving architecture of a computer system according to a second embodiment of the present invention.

Please refer to FIG. 3, which illustrates the adjustment of a data transmission rate according to another embodiment of the present invention applicable to a processor state of a computer system. The computer system 3 includes a CPU 30, a core logic chip 31, and a Front Side Bus coupled between the CPU 30 and the core logic chip 31 for data transmission therebetween. The data transmission rate of the Front Side Bus is controlled by a power management control signal issued by the core logic chip 31 and transmitted to the CPU 30. The core logic chip 31 includes a north bridge chip 313 and a south bridge chip 314. The power management control signal, for example, can be a stop clock signal issued by the south bridge chip 314. In the embodiment, the core logic chip 21 further includes a signal-detecting unit 311 and a frequency-adjusting unit 312. The signal-detecting unit 311 includes a sampler 3110, a counter 3111 and a register 3112. The frequency-adjusting unit 312 includes a comparator 3120 and a frequency-adjusting controller 3121. The sampler 3110 coupled to the south bridge chip 314 first periodically samples the stop clock signal STPCLK at specified time points within a first time period. Meanwhile, the counter 3111 coupled to the sampler 3110 counts the sampled times of an effective level, e.g. a low level, of the stop clock signal STPCLK to generate a first counting value and store the first counting value into the register 3112. Afterwards, the counter 3111 counts the occurrences of the effective level of the stop clock signal STPCLK periodically sampled by the sampler 3110 within the second period so as to generate a second counting value. Then, similar to the embodiment of FIG. 2, the comparator 3120 coupled to the counter 3111 and the register 3112 compares the first counting value and the second counting value so as to generate the index value indicating the change from the first counting value to the second counting value. If the index value is greater than a threshold, the frequency-adjusting controller 3121 issues a frequency-adjusting control signal to the CPU 30 to slow down the data transmission between the CPU 30 and the core logic chip 31. On the contrary, if the index value is less than a threshold, the frequency-adjusting controller 3121 issues a frequency-adjusting control signal to the CPU 30 to speed up the data transmission between the CPU 30 and the core logic chip 31.

Figure 4A:
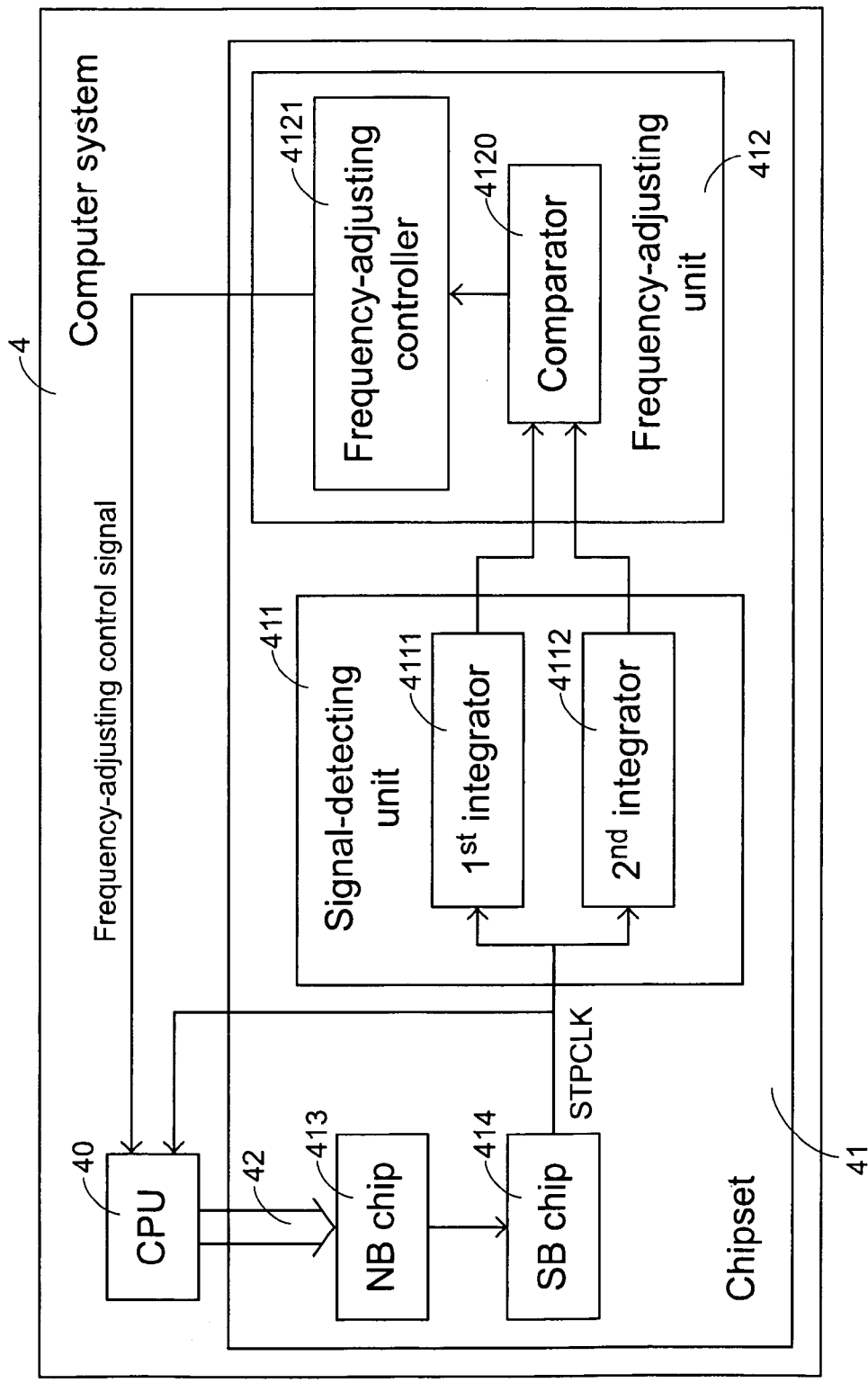
FIG. 4A is a functional block diagram schematically illustrating a power-saving architecture of a computer system according to a third embodiment of the present invention.
Figure 4B:
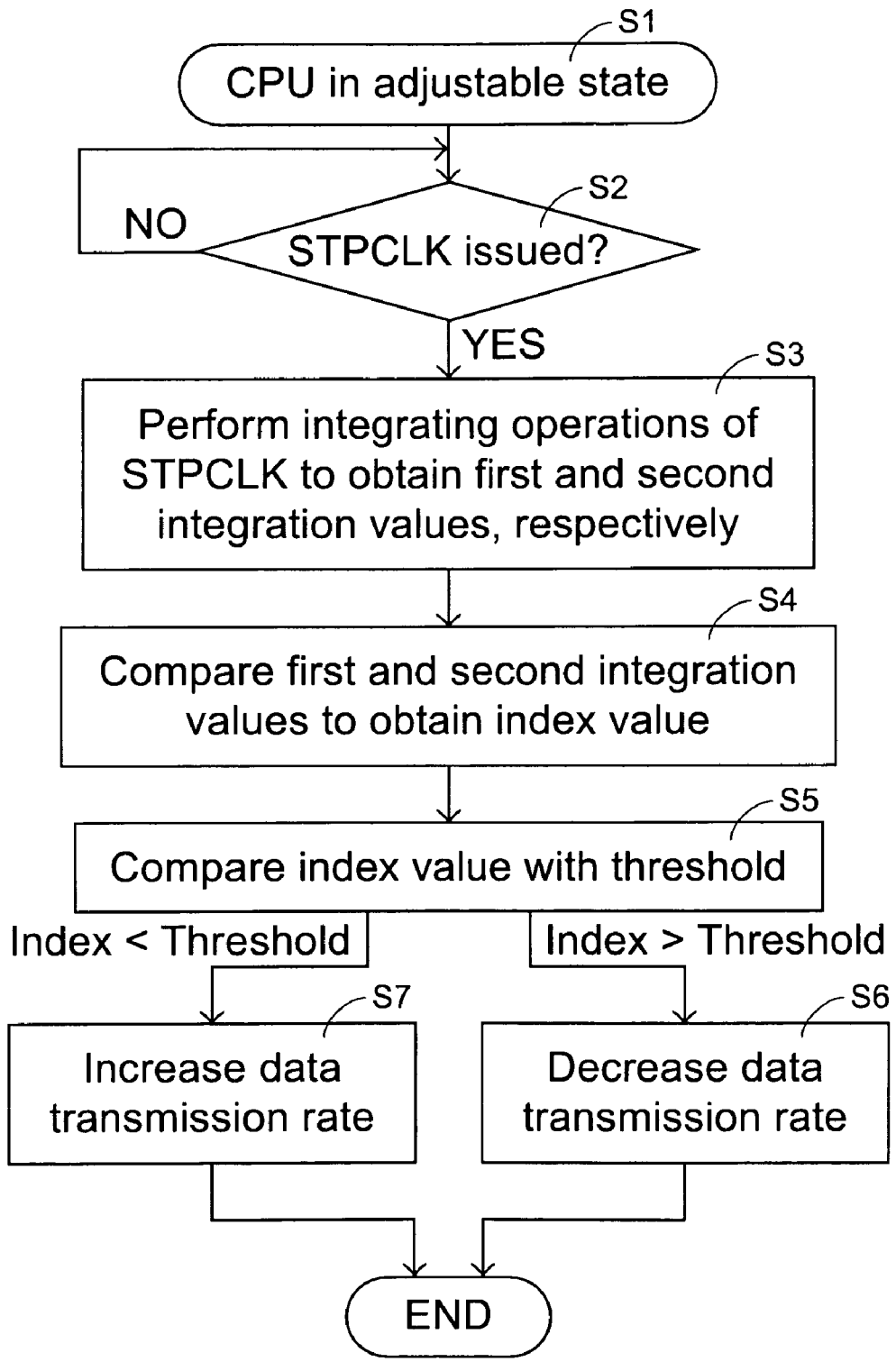
FIG. 4B is a flowchart summarizing a method for adjusting a data transmission rate applicable to the architecture of FIG. 4A.

FIG. 4 illustrates a further embodiment of the present invention. The computer system 4 has a similar architecture to the computer system 2 shown in FIG. 2A except that the signal-detecting unit 411 of the core logic chip 41 includes a first integrator 4111 and a second integrator 4112 in lieu of the combination of the sampler 2110, first counter 2111 and second counter 2112. The first integrator 4111 coupled to the south bridge chip 414 performs an integrating operation of the power management control signal (e.g. stop clock signal STPCLK) within a first time period to generate a first integration value. On the other hand, the second integrator 4112 also coupled to the south bridge chip 414 performs a similar integrating operation of the power management control signal (e.g. stop clock signal STPCLK) within a second time period to generate a second integration value. The first and second integration values are sent to the frequency-adjusting unit 412 to be compared by the comparator 4120. A difference between the first and second integration values indicating the variations of the stop clock signal is then obtained as an index value. The index value is compared with a threshold by the frequency-adjusting controller 4121 to determine the data transmission rate of the Front Side Bus 42 between the CPU 40 and the core logic chip 41 is to be increased or decreased. The flowchart of FIG. 4B summarizes the method for adjusting the data transmission rate described above.

Please refer to FIG. 4B, FIG. 4B is a flowchart summarizing a method for adjusting a data transmission rate applicable to the architecture of FIG. 4A. In this embodiment, the stop clock signal STPCLK is integrated to detect the variation of the waveform of STPCLK. The method begins at Step S1, wherein CPU enters an adjustable state (Step S1); then determine whether the stop clock signal STPCLK is issued (Step S2); if STPCLK is issued, perform integrating operations of STPCLK within first and second time periods to obtain first and second integration values, respectively (Step S3). In this step, the integrating operations may include a beforehand phase-inverted procedure of STPCLK if the effective level of SLPCLK is defined to be a low level. Alternatively, the phase-inverted procedure is not needed if the effective level of SLPCLK is defined to be a high level. Afterwards, compare first and second integration values to obtain an index value indicating the change from the first integration value to the second integration value (Step S4); then compare the index value with a threshold (Step S5); if the index value is greater than the threshold, then decrease the data transmission rate (Step S6); if the index value is less than the threshold, then increase the data transmission rate (Step S7).

Figure 5:
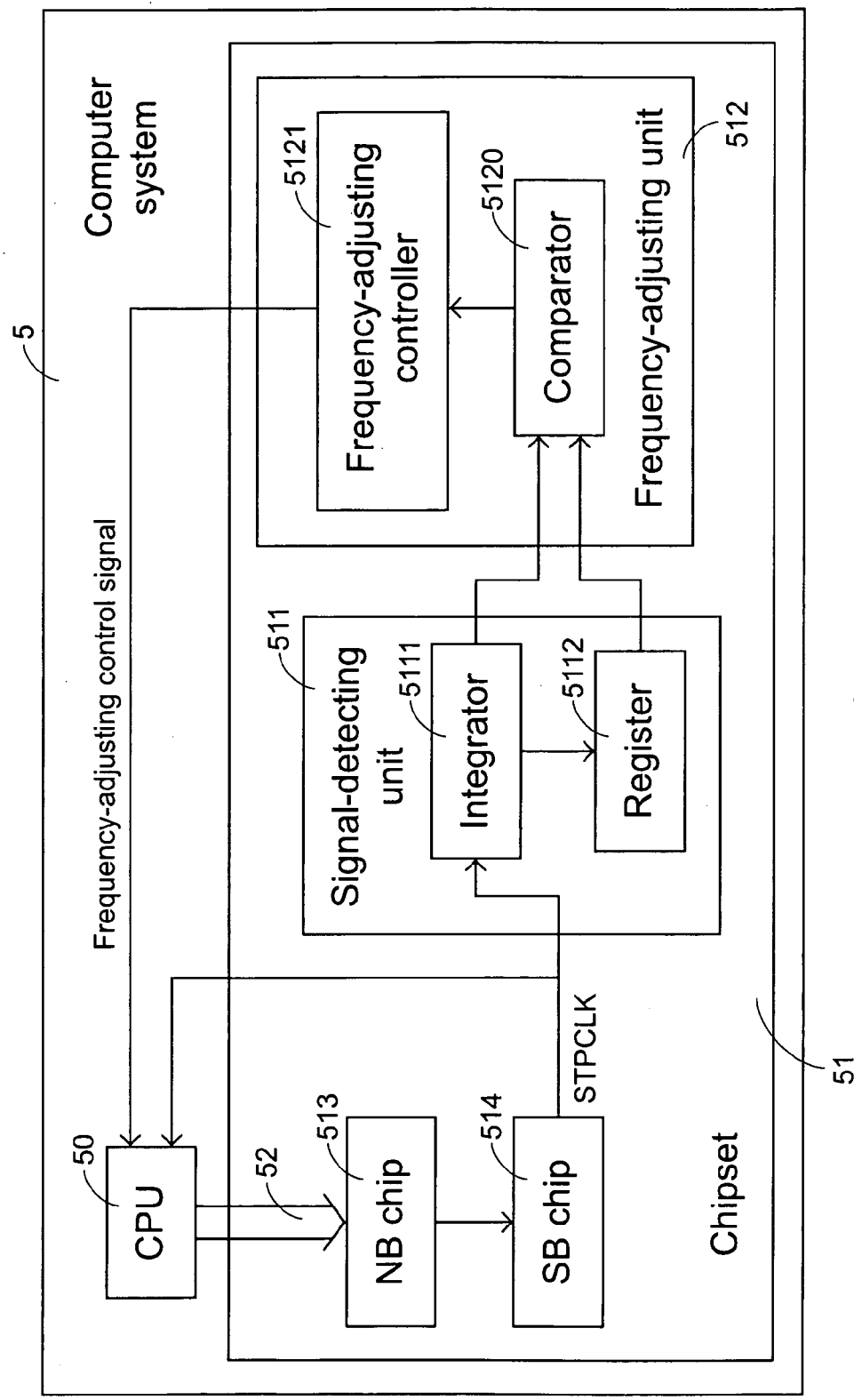
FIG. 5 is a functional block diagram schematically illustrating a power-saving architecture of a computer system according to a fourth embodiment of the present invention.

In yet another embodiment of the present invention, a register is used with a single integrator, instead of using two integrators of FIG. 4A, to detect the change of the power management control signal from the first time period to the second time period. As shown in FIG. 5, the signal-detecting unit 511 includes an integrator 5111 and a register 5112. In response to the power management control signal (e.g. a stop clock signal STPCLK) issued by the south bridge chip 514, the integration value of STPCLK obtained by the integrator 5111 within the first time period is stored into the register 5112 while the integrator 5111 further performs the integrating operation of STPCLK to obtain a second integration value within the second time period. The second and first integration values are then operated with a subtracting operation, e.g. the second integration value minus the first integration value, by the comparator 5120 to obtain an index value. The index value is compared with a threshold in response to a frequency-adjusting control signal issued by the frequency-adjusting controller 5121 to determine the data transmission rate of the Front Side Bus 52 between the CPU 50 and the core logic chip 51 is to be increased or decreased. If the index value is greater than the threshold, the data transmission rate is decreased. On the contrary, if the index value is less than the threshold, the data transmission data rate is increased. Likewise, the CPU first preferably enters C3 (the sleeping state) while the data transmission rate is changed, and then is awaken to work after the adjustment of data transmission rate has been completed.

It is noticed that the threshold could be replaced by an interval of threshold having an upper bound and a lower bound. The data transmission rate of the Front Side Bus is adjusted only when the index value is greater than the upper bound threshold (a first threshold) or less than the lower bound threshold (a second threshold), so as to prevent frequent switching of the processor state.

It is understood from the above descriptions of the present invention that a data transmission rate of a Front Side Bus between a CPU and a core logic chip of a computer system is adjustable according to the power management control signal. In other words, the data transmission rate can be adjusted practically and dynamically according to the current state of the CPU. Consequently, the performance of the computer system can be further improved.

While the invention has been described in terms of what is presently considered to be the most practical and preferred embodiments, it is to be understood that the invention needs not to be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method for adjusting a data transmission rate between a CPU and a core logic chip of a computer system in response to a power management control signal, comprising steps of:
    determining a change of an asserted time of the power management control signal from a first time period to a second time period to obtain an index value; and
    adjusting the data transmission rate between the CPU and the core logic chip according to the index value;
    wherein the power management control signal is asserted to be at an effective level and is de-asserted to be at an ineffective level.

2. The method according to claim 1 wherein the index value is obtained by:
    sampling the power management control signal at specified time points within the first time period and the second time period;
    counting sampled times of the effective level of the power management control signal within the first time period and the second time period, respectively, to generate a first counting value and a second counting value; and
    comparing the first counting value and the second counting value to obtain the index value.

3. The method according to claim 2 wherein the index value is a difference between the first counting value and the second counting value.

4. The method according to claim 1 wherein the index value is obtained by:
    performing an integrating operation of the power management control signal with respect to the effective level within the first time period and the second time period to generate a first integration value and a second integration value; and
    comparing the first integration value and the second integration value to obtain the index value.

5. The method according to claim 4 wherein the index value is a difference between the first integration value and the second integration value.

6. The method according to claim 1 wherein the data transmission rate between the CPU and the core logic chip is decreased if the index value is greater than a threshold.

7. The method according to claim 1 wherein the data transmission rate between the CPU and the core logic chip is increased if the index value is less than a threshold.

8. The method according to claim 1 further comprising steps of:
    entering an adjustable state of the computer system for issuing the power management control signal;
    entering a sleeping state of the CPU when the data transmission rate is determined to be adjusted; and
    awakening the CPU back to work when the adjustment of the data transmission rate has been completed.

9. The method according to claim 1 wherein the power management control signal is issued by the core logic chip.

10. The method according to claim 1 wherein the power management control signal is a stop clock signal issued by a south bridge chip of the core logic chip.

11. A device for adjusting a data transmission rate between a CPU and a core logic chip of a computer system in response to a power management control signal, comprising:
    a signal-detecting unit for determining a change of an asserted time of the power management control signal from a first time period to a second time period to obtain an index value; and
    a frequency-adjusting unit in communication with the signal-detecting unit for adjusting the data transmission rate between the CPU and the core logic chip according to the index value;
    wherein the power management control signal is asserted to be at an effective level and is de-asserted to be at an ineffective level.

12. The device according to claim 11 wherein the signal-detecting unit comprises:
    a sampler in communication with the core logic chip for sampling the power management control signal at specified time points within the first time period and the second time period;
    a first counter coupled to the sampler for counting sampled times of the effective level of the power management control signal within the first time period to generate a first counting value; and
    a second counter coupled to the sampler for counting the sampled times of the effective level of the power management control signal within the second time period to generate a second counting value.

13. The device according to claim 12 wherein the frequency-adjusting unit comprises:
    a comparator in communication with the first and second counters for comparing the first counting value and the second counting value to obtain the index value; and
    a frequency-adjusting controller in communication with the comparator for issuing a frequency-adjusting control signal to the CPU to decrease the data transmission rate between the CPU and the core logic chip when the index value is greater than a first threshold, and to increase the data transmission rate between the CPU and the core logic chip when the index value is less than a second threshold.

14. The device according to claim 13 wherein the first threshold is greater or equal to the second threshold.

15. The device according to claim 11 wherein the signal-detecting unit comprises:
    a sampler in communication with the core logic chip for sampling the power management control signal at specified time points within the first time period and the second time period;
    a counter coupled to the sampler for counting sampled times of the effective level of the power management control signal within the first time period to generate a first counting value, and subsequently counting the times of the effective level of the power management control signal within the second time period to generate a second counting value; and
    a register coupled to the counter for storing the first counting value while the counter is counting to obtain the second counting value.

16. The device according to claim 11 wherein the signal-detecting unit comprises:
    a first integrator in communication with the core logic chip for performing an integrating operation of the power management control signal with respect to the effective level within the first time period to generate a first integration value; and
    a second integrator in communication with the core logic chip for performing the integrating operation of the power management control signal with respect to the effective level within the second time period to generate a second integration value.

17. The device according to claim 11 wherein the signal-detecting unit comprises:
an integrator in communication with the core logic chip for performing an integrating operation of the power management control signal with respect to the effective level within the first time period to generate a first integration value, and subsequently performing the integrating operation of the power management control signal with respect to the effective level within the second time period to generate a second integration value; and
a register coupled to the integrator for storing the first integration value while the integrator is performing the integrating operation to obtain the second integration value.

18. The device according to claim 11 wherein the signal-detecting unit and the frequency-adjusting unit are disposed in the core logic chip.

19. The device according to claim 11 wherein the power management control signal is a stop clock signal issued by a south bridge chip of the core logic chip.

20. A computer system having an adjustable data transmission rate, comprising:
a CPU having a power adjustable state in response to a power management control signal; and
a core logic chip in communication with the CPU via a Front Side Bus, including:
a signal-detecting unit for determining a change of an asserted time of the power management control signal from a first time period to a second time period to obtain an index value; and
a frequency-adjusting unit in communication with the signal-detecting unit for adjusting the data transmission rate of the Front Side Bus between the CPU and the core logic chip according to the index value.

* * * * *